UNITED STATES PATENT OFFICE.

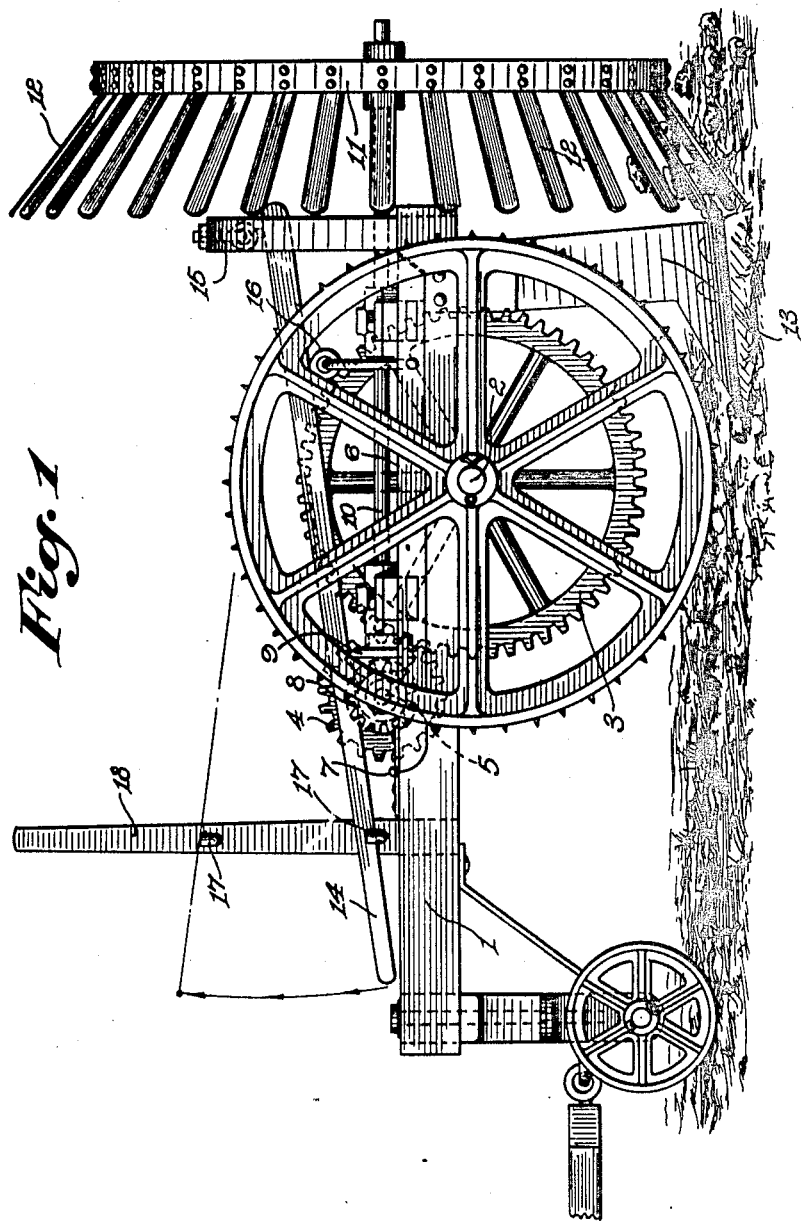

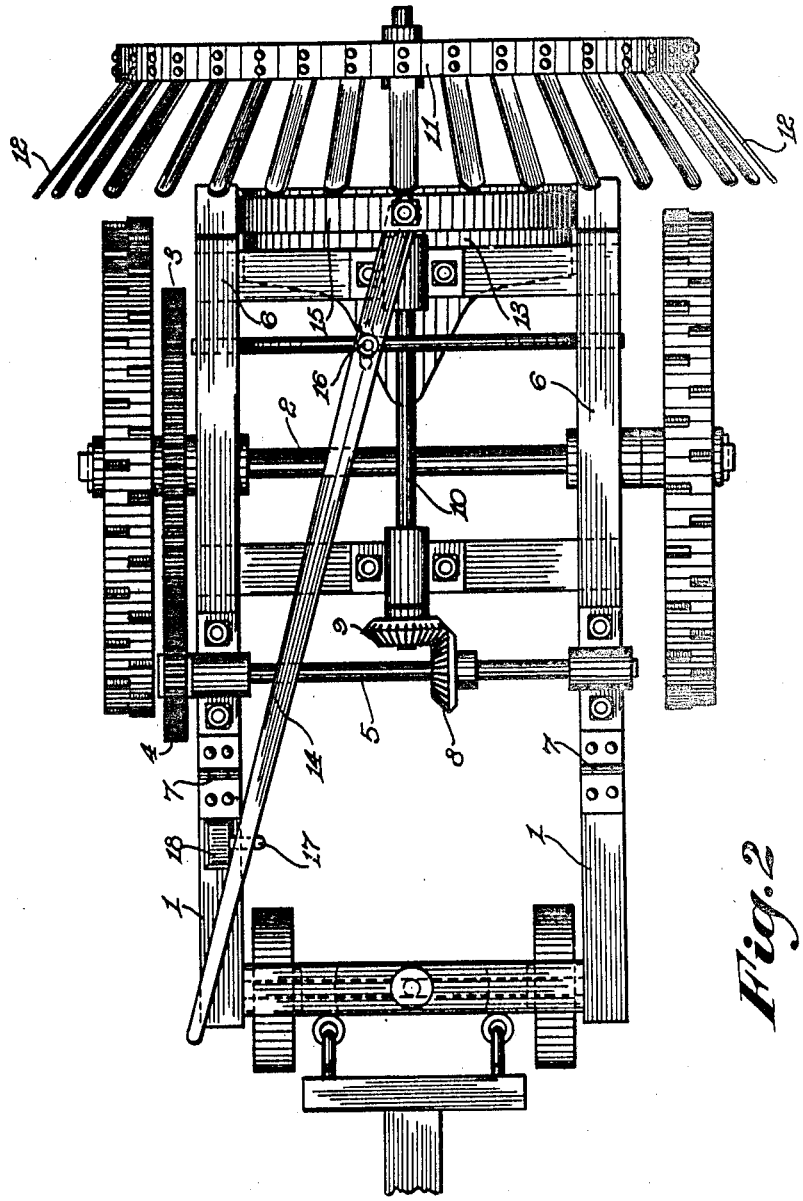

JOSEPH N. CHAMPAGNE, OF ST. CLOTHILDE, QUEBEC, CANADA, ASSIGNOR TO JOSEPH NORBERT CHAMPAGNE, JR., OF ST. CLOTHILDE, CANADA.

POTATO-DIGGER.

1,086,892.  Specification of Letters Patent.  Patented Feb. 10, 1914.

Application filed February 17, 1912.  Serial No. 678,358.

*To all whom it may concern:*

Be it known that I, JOSEPH NORBERT CHAMPAGNE, a subject of the King of Great Britain, residing at St. Clothilde, in the county of Arthabaska, Province of Quebec, Canada, have invented certain new and useful Improvements in Potato-Diggers; and I do hereby declare that the following is a full, clear, and exact description of the invention, such as will enable others skilled in the art to which it appertains to make and use the same.

The invention to be hereinafter described relates to potato digging machines.

In order to more clearly disclose the construction, operation, and use of the invention, reference should be had to the accompanying drawings forming part of the present application.

Throughout the several figures of the drawings like reference characters designate the same parts.

In the drawings: Figure 1 is a side elevation of the machine, complete; and Fig. 2 is a top plan view of the same.

Referring to the drawings in detail, 1 indicates a main supporting frame carried on wheels fixed to an axle 2 journaled in said frame. To this axle is keyed a driving gear 3 adapted to mesh with and drive a small pinion 4 fixed to a transmission shaft 5 journaled in the forward part of a supplemental frame 6 hinged to the main frame at 7. To the transmission shaft is keyed a bevel gear 8 adapted to mesh with and drive a second bevel gear 9 fixed to an operating shaft 10 journaled longitudinally in the supplemental frame and having keyed to its rear end a separating device comprising a ring 11 and a plurality of radially projecting, forwardly and outwardly extending spaced bars 12. As long as the gear 3 and pinion 4 are intermeshed, rotation of the separating device will result from forward movement of the machine. The separator is adapted to receive potatoes and earth directly from the rear end of a scoop shaped, pointed, digging blade 13, which is carried by the supplemental frame 6, directly in front of the separating device.

In order to render the machine inoperative, a lifting lever 14 is provided. This lever is fulcrumed in a curved or arched bar or plate 15 extending upwardly from the rear part of the frame 1 and carries a yoke 16 which is pivotally connected to it and has its opposite ends journaled in the side members of the supplemental frame. The opposite, or handle end of this lever is adapted to be selectively supported on either of two hooks 17 projecting from an upright or post 18 of the frame. When the lever 14 is supported on the upper hook 17, the supplemental frame will be swung upwardly about its pivotal connections 7 and the digging blade 13 and separator will be carried with it, to inoperative position. At the same time, the pinion 4 will be raised out of mesh with gear 3, thus disconnecting the driving mechanism. When the lever rests on the lower hook, as in Fig. 1, all parts will be returned to their operative positions.

As the earth and potatoes pass from the blade on to the inclined bars 12 they will be subjected to a combined tumbling and sifting operation. The loosened earth will pass through between the bars 12 and the potatoes will take a spiral course from the point where they are received on the bars, toward the outer ends thereof, being finally dropped in a more or less wide and irregular row at the side of the machine, as indicated in Fig. 1.

It is thought that the construction, operation, and use of the invention will be clear from the preceding detailed description.

Changes may be made in the construction, arrangement, and disposition of the several parts of the invention without in any way departing from the field and scope of the same, and it is meant to include all such within this application wherein only a preferred form has been disclosed.

Having thus fully described my invention, what I claim as new and desire to secure by Letters Patent is:

In combination, an axle, wheels mounted thereon, a main frame mounted on said axle, a gear keyed on the axle at one side of the main frame, a supplemental frame superimposed on the main frame and hingedly connected to the upper face thereof at its forward ends, a yoke mounted on the back end of the main frame, a second yoke having its ends pivotally mounted in both sides of the supplemental frame, a lever fulcrumed in the first mentioned yoke and pivotally connected to the last mentioned yoke, means for maintaining the lever in a raised or lowered position, digging means carried by the supplemental frame, separating means carried by the supplemental frame directly behind the digging means, and means for driving the separating means carried by the supplemental frame.

In witness whereof I have hereunto set my hand in the presence of two witnesses.

JOSEPH N. CHAMPAGNE.

Witnesses:
ALBERT CONSTANT,
THEO. HEBERT.

Copies of this patent may be obtained for five cents each, by addressing the "Commissioner of Patents, Washington, D. C."